W. G. STEPHENSON.
COUPLING DEVICE OR APPARATUS FOR THE VESTIBULES OR GANGWAYS OF CORRIDOR ROLLING STOCK FOR RAILWAYS.
APPLICATION FILED APR. 17, 1916.
1,228,616.
Patented June 5, 1917.
2 SHEETS—SHEET 1.
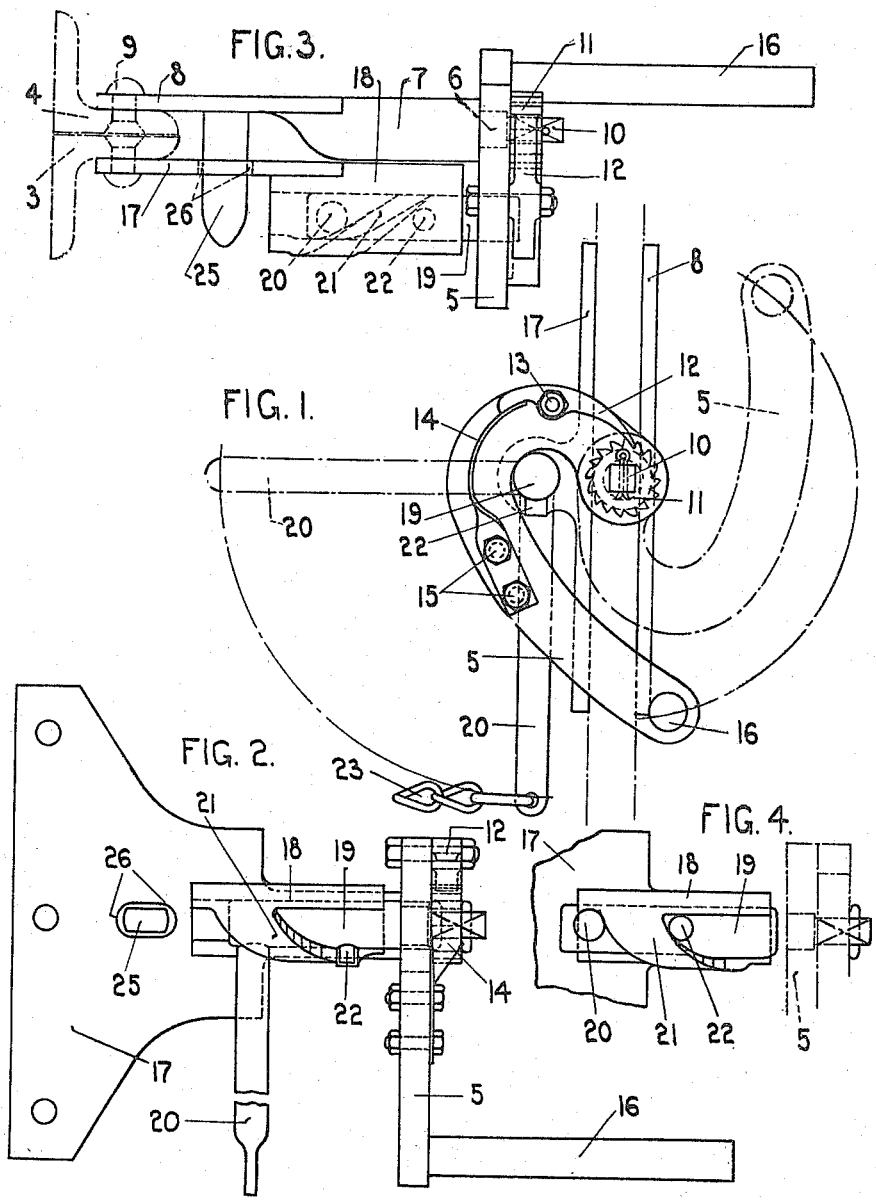
INVENTOR:
WILLIAM GEORGE STEPHENSON.
PER
ATTORNEY.

W. G. STEPHENSON.
COUPLING DEVICE OR APPARATUS FOR THE VESTIBULES OR GANGWAYS OF CORRIDOR ROLLING STOCK FOR RAILWAYS.
APPLICATION FILED APR. 17, 1916.
1,228,616.
Patented June 5, 1917.
2 SHEETS—SHEET 2.
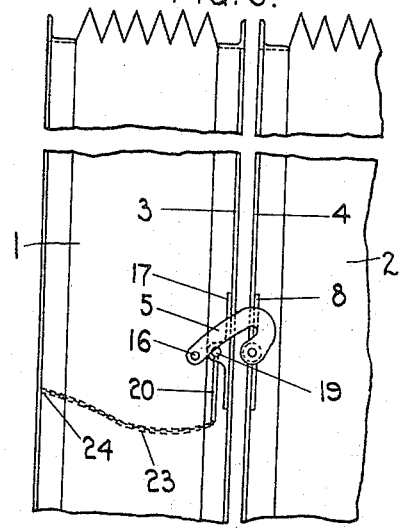
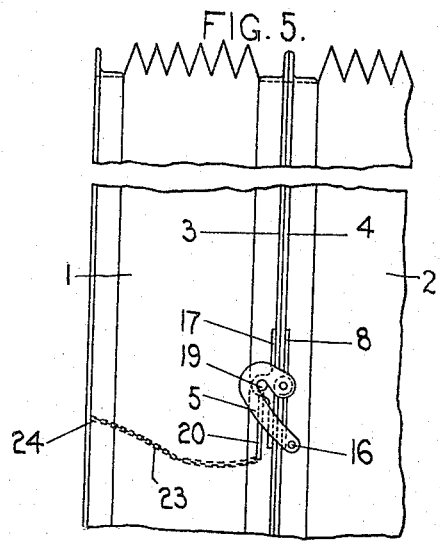
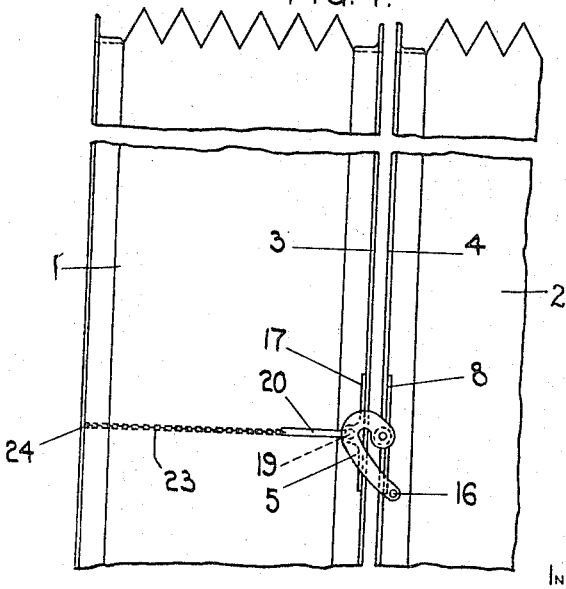
INVENTOR:-
WILLIAM GEORGE STEPHENSON
PER
ATTORNEY.

UNITED STATES PATENT OFFICE.

WILLIAM GEORGE STEPHENSON, OF BUENOS AIRES, ARGENTINA.

COUPLING DEVICE OR APPARATUS FOR THE VESTIBULES OR GANGWAYS OF CORRIDOR ROLLING-STOCK FOR RAILWAYS.

1,228,616.　　　　　Specification of Letters Patent.　　Patented June 5, 1917.

Application filed April 17, 1916. Serial No. 91,743.

*To all whom it may concern:*

Be it known that I, WILLIAM GEORGE STEPHENSON, citizen of Argentina, and a resident of the city of Buenos Aires, capital of Argentina, have invented certain new and useful Improved Coupling Devices or Apparatus for the Vestibules or Gangways of Corridor Rolling-Stock for Railways, of which the following is a specification.

This invention relates to coupling means for the vestibules or gangways of railway vehicles provided with corridors.

Heretofore the vestibules or gangways of railway vehicles have been held together or coupled by means which will not automatically uncouple should the main vehicle couplings become uncoupled or break, with the consequence that the vestibules or gangways are, in such circumstances, broken or wrenched away from one of the vehicles as the vehicles move apart. Also it frequently happens that when vehicles are uncoupled by a railway operative the latter omits to uncouple the vestibules or gangways of two, or it may be more, of the vehicles, in which case when one or more of the vehicles are moved the vestibules or gangways are broken or wrenched from the ends of the vehicles.

The present invention has for its object and consists in a coupling device or apparatus, for the vestibules or gangways of railway vehicles, which is such that as the vehicles move apart the device or apparatus will be automatically operated and will uncouple or release the vestibules, the device or apparatus being also such that the vestibules when coupled are securely fastened or held together, and is further such as to be easily manipulated, the usual pinch-bars heretofore employed for manually coupling and uncoupling the vestibules being dispensed with.

A device or apparatus according to one embodiment of the present invention comprises a hook or the like mounted on one vestibule and adapted to engage or coöperate with a sliding bolt mounted on the adjacent vestibule, means being provided for automatically releasing the bolt from the hook or the like when the vehicles move apart. The hook or the like is mounted on a spindle so as to be capable of rotation in a vertical plane parallel to the longitudinal central plane of the vehicles, means being provided whereby such hook or the like is free to rotate in one direction only, which is the direction for effecting coupling of the vestibules. The bolt is arranged in a horizontal casing so as to slide therein in a direction at right angles to the plane of rotation of the hook, the bolt normally projecting from its casing so as to be engaged by the hook, and means being provided for withdrawing the bolt from engagement with the hook automatically when the vehicles part, such means being also such as to be manually operable if required.

Further features of a device or apparatus according to the present invention will be pointed out in the claims appended hereto and described hereinafter with reference to the accompanying drawings, in which:—

Figure 1 is a front elevation of an apparatus according to this invention detached from the vestibules but with the parts in their relative positions when acting to fasten the vestibules together.

Fig. 2 is a side elevation of the parts shown in Fig. 1.

Fig. 3 is a plan of the apparatus, shown in Fig. 2.

Fig. 4 is a fragmentary view illustrating the bolt 19, Fig. 2, in its operated or "withdrawn" position, and Figs. 5, 6 and 7 illustrate (more or less diagrammatically) portions of a pair of vestibules with the parts of an apparatus according to this invention in different positions, as will be hereinafter referred to and explained.

Like reference symbols indicate like parts in the several figures of the drawings.

Referring to the drawings, in Figs. 5, 6 and 7, 1 and 2 are portions of a pair of vestibules. A fastening device or apparatus according to this invention is provided at each side of a pair of vestibules, each vestibule portion having at one side the hook portion of the apparatus and at the other side the bolt portion above referred to. 3, 4 are the frames of the vestibules adapted to abut against one another when the vestibules are coupled. One apparatus, *i. e.* an apparatus at one side of the pair of vestibules, will be described in detail, the other apparatus being identically the same. 5 is a hook or hook shaped lever which is rotatably mounted at 6 on a fixed spindle or bearing pin 7 secured to or formed in one with a plate 8 adapted to be secured by rivets 9, or otherwise, to the frame 4 of the vestibule 2. 10 is a ratchet wheel mounted on a squared portion 11 of, or otherwise secured against rotation on, the spindle 7. 12 is a pawl pivoted at 13 on the hook or lever 5, and 14 is a spring secured at 15 to hook 5 and acting to normally hold the pawl 12 in engagement with the ratchet wheel 11. The hook 5 is thus free to be rotated in an anti-clockwise direction, the pawl slipping over the teeth of the ratchet wheel 11, but rotation in a clockwise direction is prevented. 16 is a handle by means of which rotary movement may be given to the hook 5.

17 is a plate fixed, as by rivets, to the frame 3 of the other vestibule, which plate carries, or is formed so as to provide, a casing 18 having a cylindrical bore for the hereinbefore mentioned bolt 19. 20 is an operating handle or lever for the bolt 19. The casing 18 is cut away so as to leave a sloping or cam like bar portion 21. The lever 20 lies at one side of said portion 21, and pin or peg 22 lies at the other side of said portion 21, the lever 20 and peg 22 engaging or coöperating with the cam surfaces of the portion 21 so that when the bolt 19 is rotated it is also moved longitudinally in its casing. The lever 20 and peg 22 preferably lie in the same plane longitudinally of the bolt 19. 23 is a chain of predetermined length connected at one end to the outer end of lever 20 and at the other end to a fixed point on the end of the vehicle, as at 24, Figs. 5, 6 and 7. The position of the parts in which the vestibules are coupled is illustrated in Figs. 1, 2, 3 and 5.

The automatic uncoupling action of the parts of the apparatus is as follows:—

Assuming the vehicles to have been uncoupled (or the vehicle coupling to have broken) and one vehicle to be moving away from the other, the vestibules are expanded from the condition shown in Fig. 5. As this expansion takes place the frame 3 carrying the bolt 19 is moved away from the fixed point 24 at which the one end of chain 23 is secured and such chain is put in tension. As the tension increases the chain draws the lever 20 into a horizontal position, as shown in Fig. 7, and such movement of the lever 20 rotates bolt 19 in its casing. During the rotation of the bolt, by reason of the engagement of the lever 20 with the cam surface on the part 21, the bolt is also drawn into its casing to the position shown in Fig. 4, and its end is disengaged from the hook 5. The vestibules will thus have become uncoupled, as the apparatus at both sides will have operated simultaneously.

To couple the vestibules, the coaches are moved together and the main coupling of the vehicles effected. The handle 20 will, by its own weight, have moved to the vertical position, or it is moved to such position by hand, and the bolt will be in its projected position. The hook 5 is moved to say the position shown in chain dotted lines in Fig. 1 by the handle 16, and, assuming the frames 3, 4 to be relatively close together, as in Fig. 6, is further rotated into the position shown in Fig. 6 so as to engage the bolt 19, the completed movement of the hook 5 drawing the frames 3, 4 into close contact, and moving the hook 5 into the position shown in Figs. 1 and 5.

25, Figs. 2 and 3, is a pin secured to the plate 8 on one vestibule and adapted to enter a hole 26 in the plate 17 on the other vestibule, this pin being provided to assist the railway operatives in positioning the adjacent end frames 3, 4 when coupling the vestibules. The end of the pin 25 is preferably reduced or tapered as shown so as to facilitate its entry in the hole 26. The pin 25 also acts to prevent, or assists in preventing, relative vertical movement of the frames 3, 4 of the vestibules when coupled.

It will be understood that the length of the chain 23 is just sufficient that the increase from the normal amount of expansion of the respective flexible side of the vestibule which obtains when running on a curve will not put the chain in tension, but is such that with any greater increase of such expansion will exert a pull on the chain.

The invention is of course not limited to the constructional details shown in the drawings, as these details may be varied in many respects while still retaining the main features of apparatus according to this invention.

What I claim as my invention and desire to secure by Letters Patent is:—

1. In a curtain releaser, a casing secured to one vestibule frame, a bolt slidable in the casing, a hook pivoted to the opposed vestibule frame and movable crosswise of the said bolt and adapted to engage with its front end portion, and means for automatically retracting the said bolt out of engagement with the hook when the vestibules are moved apart as set forth.

2. In a curtain releaser, a casing secured to one vestibule frame, a bolt slidable longitudinally in and revoluble in the said casing, an operating handle projecting from the bolt, means for sliding the bolt longitudinally when it is moved circumferentially by the said handle, a hook pivoted to the opposed vestibule frame and movable crosswise of the said bolt and adapted to engage with its front end portion, and means for operating the said handle automatically so as to retract the bolt when the vestibules are moved apart as set forth.

3. In a curtain releaser, a casing secured to one vestibule frame, a bolt slidable in the casing, a pin secured to the opposed vestibule frame and arranged parallel to the said bolt, a hook journaled on the said pin and adapted to engage with the front end portion of the said bolt, means for preventing the said hook from revolving backwardly, and means for automatically retracting the said bolt out of engagement with the hook when the vestibules are moved apart as set forth.

4. In a curtain releaser, a pair of opposed vestibule frames, a casing secured to one of the frames, a bolt slidable in the said casing, a hook-shaped lever pivoted to the other frame and movable crosswise of the said bolt and having an eccentric surface adapted to engage with its front end portion and operating to draw the frames together when the lever is turned by hand in one direction, and means for automatically retracting the said bolt out of engagement with the hook-shaped lever when the vestibules are moved apart as set forth.

Signed at Buenos Aires, Argentine Republic, this tenth day of February, A. D. 1916.

WILLIAM GEORGE STEPHENSON.

Witnesses:
K. W. HUNTINGTON,
I. GIBBONS.

Copies of this patent may be obtained for five cents each, by addressing the "Commissioner of Patents, Washington, D. C."